UNITED STATES PATENT OFFICE.

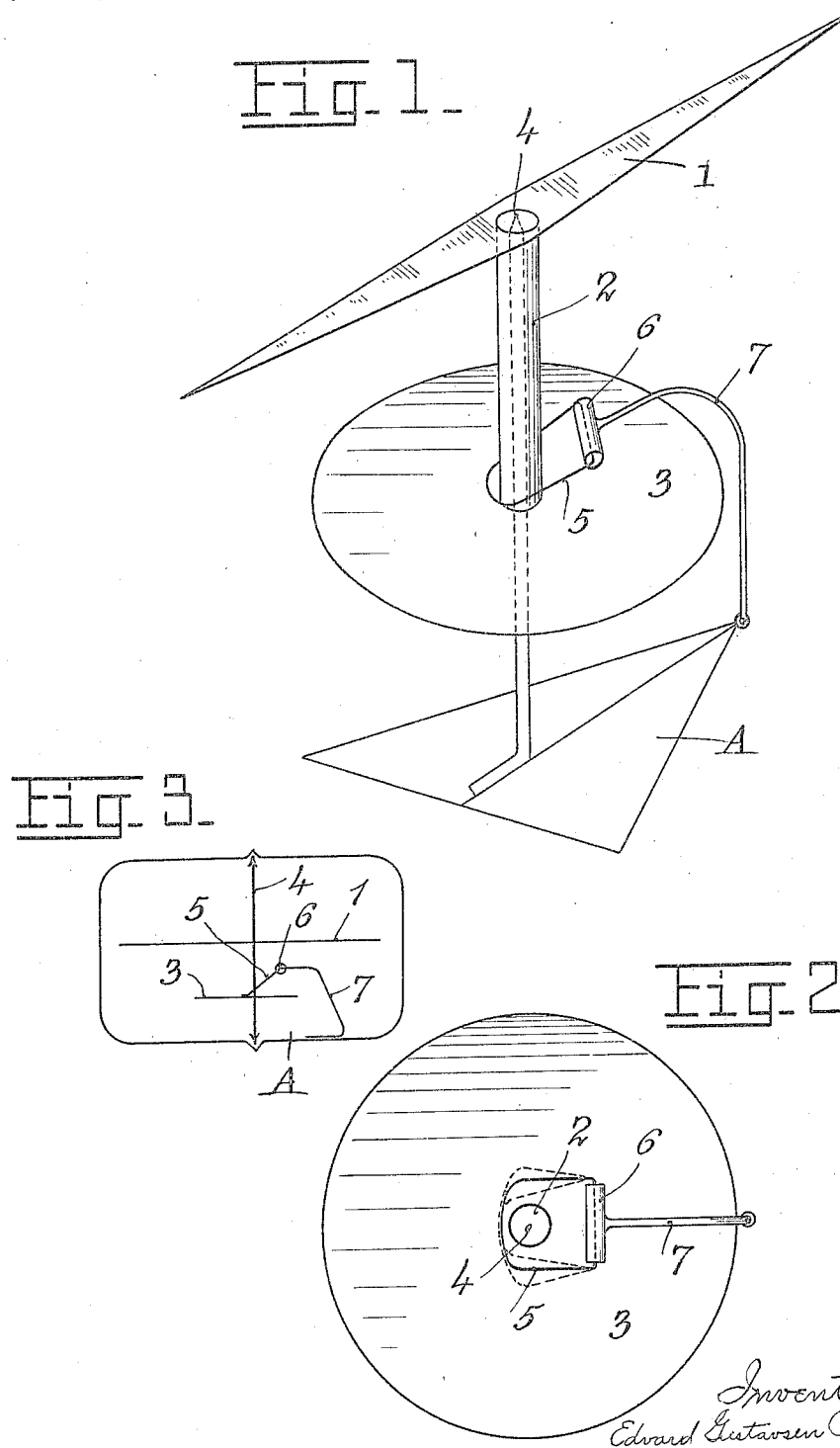

EDVARD GUSTAVSEN BERGMANN, OF CHRISTIANIA, NORWAY.

DAMPING DEVICE FOR COMPASSES.

1,384,885.

Specification of Letters Patent.  Patented July 19, 1921.

Application filed June 11, 1920. Serial No. 388,115.

*To all whom it may concern:*

Be it known that I, EDVARD GUSTAVSEN BERGMANN, a subject of the King of Norway, residing at Christiania, Norway, have invented certain new and useful Improvements in Damping Devices for Compasses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to compasses particularly of the kind which are adapted for use on ships, aeroplanes and the like, where the compass needle is exposed to violent oscillations, and the invention has for its object a damping device, which is intended to damp the oscillations of the needle without making the same less movable.

In accordance with the invention the compass needle is provided with a damping disk against the upper surface of which rests a hoop loosely mounted some distance above the disk surface in such a manner that the hoop may perform a limited radial movement with relation to the disk, while at the same time it is adapted to follow small oscillations of the disk without sliding on the same.

On the drawing is diagrammatically illustrated two forms of the invention:

Figure 1 is a perspective sketch of the damping device in combination with a compass needle pivoted on a point.

Fig. 2 is a plan of the damping disk on Fig. 1.

Fig. 3 is an axial section through the device in combination with a compass needle mounted between two points.

According to the arrangement illustrated on Fig. 1, 1 designates the compass needle, which is connected by means of tube 2 with a damping disk 3 and which is pivoted on the point 4 of a vertical needle mounted in a base A and passing through tube 2. On the damping disk 3 is supported the free end of a hoop 5 inclosing tube 2 and being mounted loosely in a sleeve 6 at the free end of an arm 7 connected with the base A or frame of the compass.

The free front end of hoop 5 is supported by disk 3 and thereby acts to damp the oscillation of the compass needle, but owing to its being mounted loosely in the sleeve 6 the hoop is allowed to follow the disk during certain small oscillations of the same without damping said oscillations perceptibly.

On Fig. 2 is indicated in dotted lines the extreme positions between which the hoop is allowed to play in sleeve 6 without sliding on disk 3.

On Fig. 3 is diagrammatically indicated the same arrangement in combination with a compass the needle 1 of which is mounted on a shaft 4 located between two point bearings. In this case the damping disk 3 is mounted directly on shaft 4. Arm 7 should preferably be capable of bending so that it may be adjusted radially with regard to the compass needle 1, whereby hoop 5 can be made to touch the disk at a longer or shorter distance from the center of the same thereby causing a stronger or weaker damping action.

Claims.

1. In a damping device for compasses such as ships or aeroplane compasses the combination with a compass needle, a damping disk fastened to the compass needle of a horizontal sleeve or bearing, a hoop or arm loosely mounted in said sleeve or bearing and resting with its free end on the damping disk in such a manner that it may follow small oscillations of the disk without sliding on the same.

2. In a damping device for compasses such as ships or aeroplane compasses the combination with a compass needle, a damping disk fastened to the compass needle of a hoop or arm resting with its free end on the damping disk, a horizontal sleeve in which the hoop is loosely mounted whereby it may follow small oscillations of the disk without sliding on the same, said sleeve or bearing being adapted to be adjusted radially with relation to the disk to regulate the damping effect.

3. In a damping device for compasses, the combination of a compass needle, a disk connected with a damping member in frictional engagement with the disk, and means supporting the damping member whereby it is loosely mounted so as to follow small oscillations of the disk without sliding on the latter.

In testimony that I claim the foregoing as my invention, I have signed my name in presence of two subscribing witnesses.

EDVARD GUSTAVSEN BERGMANN.

Witnesses:
  MATH. A. HEDENSCHON,
  ROBERT H. FRAZEIR.